United States Patent
Fukumaru et al.

(10) Patent No.: US 7,743,484 B2
(45) Date of Patent: Jun. 29, 2010

(54) ROTOR SHAFT AND METHOD OF MANUFACTURING THE SAME

(75) Inventors: Kenichiro Fukumaru, Nishikamo-gun (JP); Gou Katou, Kitakyushu (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 122 days.

(21) Appl. No.: 11/992,889

(22) PCT Filed: Sep. 27, 2006

(86) PCT No.: PCT/JP2006/319825

§ 371 (c)(1),
(2), (4) Date: Mar. 31, 2008

(87) PCT Pub. No.: WO2007/049433

PCT Pub. Date: May 3, 2007

(65) Prior Publication Data

US 2009/0056103 A1    Mar. 5, 2009

(30) Foreign Application Priority Data

Oct. 26, 2005 (JP) .............................. 2005-311029

(51) Int. Cl.
*H02K 15/02* (2006.01)
*H02K 15/10* (2006.01)
(52) U.S. Cl. ............... 29/598; 29/517; 29/888.025; 29/596; 310/41; 411/361
(58) Field of Classification Search ............ 29/598, 29/517, 888.025, 596; 310/42; 411/361
See application file for complete search history.

(56) References Cited

U.S. PATENT DOCUMENTS

| 3,872,578 A | 3/1975 | Ullom |
| 4,818,166 A | 4/1989 | Szukay et al. |

FOREIGN PATENT DOCUMENTS

| GB | 2 067 850 A | 7/1981 |
| JP | 50-119212 | 9/1975 |
| JP | 63-034311 | 2/1988 |
| JP | 2004-048925 A | 2/2004 |
| JP | 2004048925 A * | 2/2004 |
| JP | 2004-357347 A | 12/2004 |
| JP | 2004357347 A * | 12/2004 |

* cited by examiner

*Primary Examiner*—Derris H Banks
*Assistant Examiner*—Jeffrey Carley
(74) *Attorney, Agent, or Firm*—Kenyon & Kenyon LLP

(57) ABSTRACT

Disclosed is a method of manufacturing a rotor shaft including a rotor and a shaft having a groove formed on a periphery to open radially outwardly, the rotor being fixed to the shaft through a caulking plate disposed on the periphery of the shaft and adjacent the rotor in an axial direction thereof. This method comprises the step of caulking the caulking plate to fix the rotor to the shaft by applying a load to an end portion of the caulking plate from outside in a radial direction, opposite the groove, when the caulking plate is disposed in the predetermined place, causing a part of the caulking plate to be press-fitted into the groove. This caulking and fixing step includes pressing a punch against the caulking plate from outside in a radial direction of the shaft, thereby fixing the rotor to the shaft.

9 Claims, 14 Drawing Sheets

| | RATIO OF WIDTH TO DIAMETER | GAP BETWEEN END PLATE AND ROTOR CORE |
|---|---|---|
| A | 15% | UNFORMED |
| B | 22% | UNFORMED |
| C | 26% | FORMED |
| D | 31% | FORMED |

ROTOR SHAFT AND METHOD OF MANUFACTURING THE SAME

This is a 371 national phase application of PCT/JP2006/319825 filed 27 Sep. 2006, claiming priority to Japanese Patent Application No. 2005-311029 filed 26 Oct. 2005, the contents of which are incorporated herein by reference.

TECHNICAL FIELD

The present invention relates to a rotor shaft with a shaft and a rotor fixed together by caulking, as well as a method of manufacturing the rotor shaft.

BACKGROUND ART

Japanese unexamined patent publication No. 2004-48925 discloses the following invention as a method of fixing a shaft and a rotor by caulking. FIGS. 20 and 21 illustrate Example 1 of a method for fixing a rotor 112 to a shaft 111 which method is disclosed in the publication '925. As shown in FIG. 20, the rotor 112 is disposed on a flange portion 111a of the shaft 111 and a fixing member 113 is disposed on the rotor 112. Further, a caulking jig 114 is disposed so as to be movable along a cutout portion 111d of a shaft portion 111c of the shaft 111. The inside diameter of a tip portion 114a is set larger than the outside diameter of the cutout portion 111d of the shaft 111 and smaller than the diameter of the shaft portion 111c of the shaft 111.

In such a construction, the caulking jig 114 is brought into abutment against a terminal end of the cutout portion 111d of the shaft 111, causing the caulking jig 114 and the shaft 111 to rotate relatively to each other. As a result, as shown in FIG. 21, a boundary portion between the shaft portion 111c of the shaft 111 and the cutout portion 111d is caulked by the caulking jig 11, whereby a protuberance 115 is formed. Consequently, the fixing member 113 is caulked fixedly to the shaft 111 by the protuberance 115.

FIGS. 22 and 23 illustrate Example 2 of the method for fixing a shaft and a rotor to each other by caulking which method is disclosed in the publication '925. As shown in FIG. 22, a rotor 112 is disposed on a flange portion 111a of a shaft 111 and a fixing member 113 is disposed on the rotor 112. Further, a caulking jig 116 is disposed so as to be movable along a shaft portion 111c of the shaft 111. The caulking jig 116 is formed with a tapered surface 116a.

In such a construction, a load is applied in the axial direction of the rotor 112 under rotation of the caulking jig 116. As a result, the fixing member 113 is compressed with a load induced by the tapered surface 116a of the caulking jig 116, causing an upper end portion 113a in the figure of the fixing member 113 to get into a groove 111b of the shaft, 111, whereby the fixing member 113 is caulked fixedly to the shaft 111.

DISCLOSURE OF THE INVENTION

Problems to be Solved by the Invention

According to Example, 1 of the shaft-rotor fixing method by caulking disclosed in the above publication '925, the shaft 111 can be deformed and caulked in the case where the outside diameter of the rotor 112 is about 160 mm and the outside diameter of the shaft 111 is correspondingly large. However, in the case where the outside diameter of the rotor 112 is about 130 mm and the outside diameter of the shaft 111 is correspondingly small, it is difficult to fabricate the caulking jig 114 capable of being structurally disposed around the shaft 111 on the smaller diameter side.

According to Example 2 of the shaft-rotor fixing method by caulking disclosed in the above publication '925, the entire upper end portion 113a in the figure of the fixing member 113 is fully inserted into the groove 111b of the shaft 111, but there occur marked variations in size in the axial direction of the rotor 112, with a consequent result that the caulking load required for caulking may become large. Besides, since the upper end portion 113a of the fixing member 113 is press-fitted into the groove 111b of the shaft 111 by pressing and thereby buckling the upper end portion 113a in the axial direction of the rotor 112, there is a fear of an increase of the caulking load required for caulking. Consequently, in the case where, it is impossible to use a large caulking load, it may be impossible to ensure a required extraction load of the rotor 112 at which load the fixed state by caulking with the fixing member 113 is released upon rotation of the rotor shaft and exertion of a centrifugal force or G at the crash on the rotor 112 with a consequent extraction of the rotor 112 from the shaft 111.

Further, as a point common to both Examples 1 and 2 described in the above publication '925, it is impossible to check after the fixing by caulking whether the rotor 112 has been fixed, by the fixing member 113 while ensuring its extraction load required for the shaft 111. Therefore, it is impossible to guarantee the quality of the rotor shaft after the fixing by caulking.

Accordingly, it is an object of the present invention to propose a rotor shaft and a method of manufacturing the same capable of fixing a rotor to a shaft by caulking even where the rotor is of a small outside diameter and capable of making small the caulking load necessary for caulking, thereby ensuring a required rotor extraction load and guaranteeing the quality after the fixation by caulking.

Means for Solving the Problems

To achieve the above object, the present invention provides a method of manufacturing a rotor shaft including a rotor and a shaft having a groove formed, on a periphery to open radially outwardly, the rotor being fixed to the shaft through a fixing member disposed in a predetermined place in contact with the periphery of the shaft including the groove and adjacent the rotor in an axial direction thereof, characterized in the method comprising the step of: caulking the fixing member to fix the rotor to the shaft by applying a load to an end portion of the fixing member from outside in a radial direction, opposite the groove, when the fixing member is disposed in the predetermined place, causing a part of the fixing member to be press-fitted into the groove, the caulking and fixing step including pressing a caulking jig against the fixing member from outside in a radial direction of the shaft, thereby fixing the rotor to the shaft.

Accordingly, it is not that the shaft is deformed, but the fixing member is deformed. Therefore, even where the outside diameter of the rotor is small, it is possible to fabricate a corresponding caulking jig and fix the rotor to the shaft. Besides, the pressing force of the caulking jig acts in the direction that causes the fixing member to be press-fitted into the groove of the shaft, and thus the caulking load can be made small. This makes it possible to ensure the required extraction load of the rotor. Further, after the fixation by caulking, the extraction load of the rotor can be checked by measuring the outside diameter of the caulked portion of the fixing member. Thus, it is possible to ensure the quality of the rotor shaft after the fixation by caulking.

In the above method, preferably, the caulking and fixing step including fixing the rotor to the shaft with a pressing jig which presses the fixing member against the rotor in the axial direction thereof while ensuring a clearance between the pressing jig and the rotor.

The rotor can therefore be fixed more reliably because a gap is not formed between the fixing member and the rotor after the fixation by caulking.

In the above method, further preferably, the caulking and fixing step includes fixing the rotor to the shaft by caulking under a condition of $(\theta s-20)<\theta p<(\theta s-10)$, assuming that a cut-in angle of the groove relative to the periphery of the shaft is $\theta s$ and an angle between a tapered shape of a tip of the caulking jig for pressing the fixing member and the axis of the rotor is $\theta p$.

Accordingly, the caulking jig can be fabricated without any problem in point of machining strength and can ensure a required pressing quantity by applying a predetermined caulking load thereto. This makes it possible to surely ensure the extraction load required of the rotor.

In the above method, the caulking jig may be formed of a plurality of divided parts arranged in a circumferential direction.

After the fixation by caulking, it is therefore possible to visually check whether the caulking and fixing step is over or not and that therefore it is possible to guarantee the quality of the rotor shaft after the fixation by caulking.

According to another aspect, the present invention provides a method of manufacturing a rotor shaft including a rotor and a shaft having a groove formed on a periphery to open radially outwardly, the rotor being fixed to the shaft through a fixing member disposed in a predetermined place in contact with the periphery of the shaft including the groove and adjacent the rotor in an axial direction thereof, characterized in the method comprising the step of: caulking the fixing member to fix the rotor to the shaft by applying a load to an end portion of the fixing member from outside in a radial direction, opposite the groove, when the fixing member is disposed in the predetermined place, causing a part of the fixing member to be press-fitted into the groove, the caulking and fixing step including fixing the rotor to the shaft by caulking under a condition of $\Delta c=T-\Delta t$, assuming that a clearance quantity between a caulking jig and the shaft is a punch-shaft clearance quantity $\Delta c$, the caulking jig being adapted to move up and down in the axial direction of the rotor to apply a load to the end portion of the fixing member from outside in the radial direction, opposite the groove, the thickness of the portion of the fixing member to which portion the radial load is applied by the caulking jig is a fixing member thickness T, and the depth in the groove in which depth a part of the fixing member is received is a groove bite-in depth $\Delta t$.

Accordingly, it is not that the shaft is deformed, but the fixing member is deformed. Therefore, even where the outside diameter of the rotor is small, it is possible to fabricate the corresponding caulking jig and fix the rotor to the shaft by caulking. Besides, since the amount of the fixing member getting into the clearance between the shaft and the punch is increased to enhance the strength thereof, there is no fear of a part of the fixing member falling off during caulking and when pulling out the caulking jig from the shaft, thus making it possible to prevent the formation of a burr.

In the above method, preferably, the caulking member is formed with a tapered surface on an inner periphery thereof through which the radial load is applied to the fixing member.

With a small caulking load, accordingly, the fixing member can be press-fitted into the groove of the shaft to fix the rotor to the shaft 11 and hence a required extraction load of the rotor can be ensured more reliably.

In the above method, further preferably, the fixing member has a tapered portion on an outer periphery thereof opposite the groove, the tapered portion being formed so that an intersecting point between an extension line of the tapered portion and the outer periphery of the shaft lies on an outside diameter of the shaft and within the area of the groove.

Accordingly, the fixing member can be press-fitted positively into the groove of the shaft to fix the rotor to the shaft, whereby the required extraction load of the rotor can be ensured more reliably.

In the above method, preferably, the caulking jig is formed, on a rotor side end surface, with a projection for making an engraved mark on the fixing member when fixing the rotor to the shaft by caulking.

After the fixation by caulking, the caulked state can be checked by seeing the appearance of the rotor shaft and that therefore it is possible to guarantee the quality of the rotor shaft after the fixation of the caulking.

According to another aspect, the present invention provides a rotor shaft comprising a rotor including a rotor core constituted by laminated steel sheets in a hollow cylindrical shape and an end plate disposed adjacent the rotor core in an axial direction of the rotor core, with a cutout portion being formed in an end face of the end plate on the rotor core side, so that the end plate is in contact with the rotor core through two inner-periphery and outer periphery contact surfaces, and a shaft on which the rotor is fixed through a fixing member, characterized in that the rotor core and the end plate are designed so that a condition of $(2 \times W/De)<0.26$ is satisfied, assuming that a radial width of the inner periphery-side contact surface of the end plate for contact with the rotor core is W and the diameter of the end plate is De.

Consequently, there is no fear of a gap being formed between the end plate and the rotor core in the outer periphery portion. This makes it possible to prevent the core from being broken by a centrifugal force during high-speed rotation.

In the above rotor shaft, preferably, the shaft is formed with a groove on a periphery, the rotor is fixed by caulking to the shaft though the fixing member disposed in a predetermined place of the shaft including the groove and an allowance for projection corresponding to a width of the fixing member between an end of the fixing member in the axial direction of the rotor, the fixing member being fixed to the shaft by caulking, and an edge of the groove is larger than a depth of the groove of the shaft in the radial direction.

It is therefore possible to prevent a part of the front end portion of the fixing member from projecting beyond the groove of the shaft to form a burr.

BEST MODE FOR CARRYING OUT THE INVENTION

Embodiments of the present invention will be described hereinafter.

First Embodiment

Figure 1:
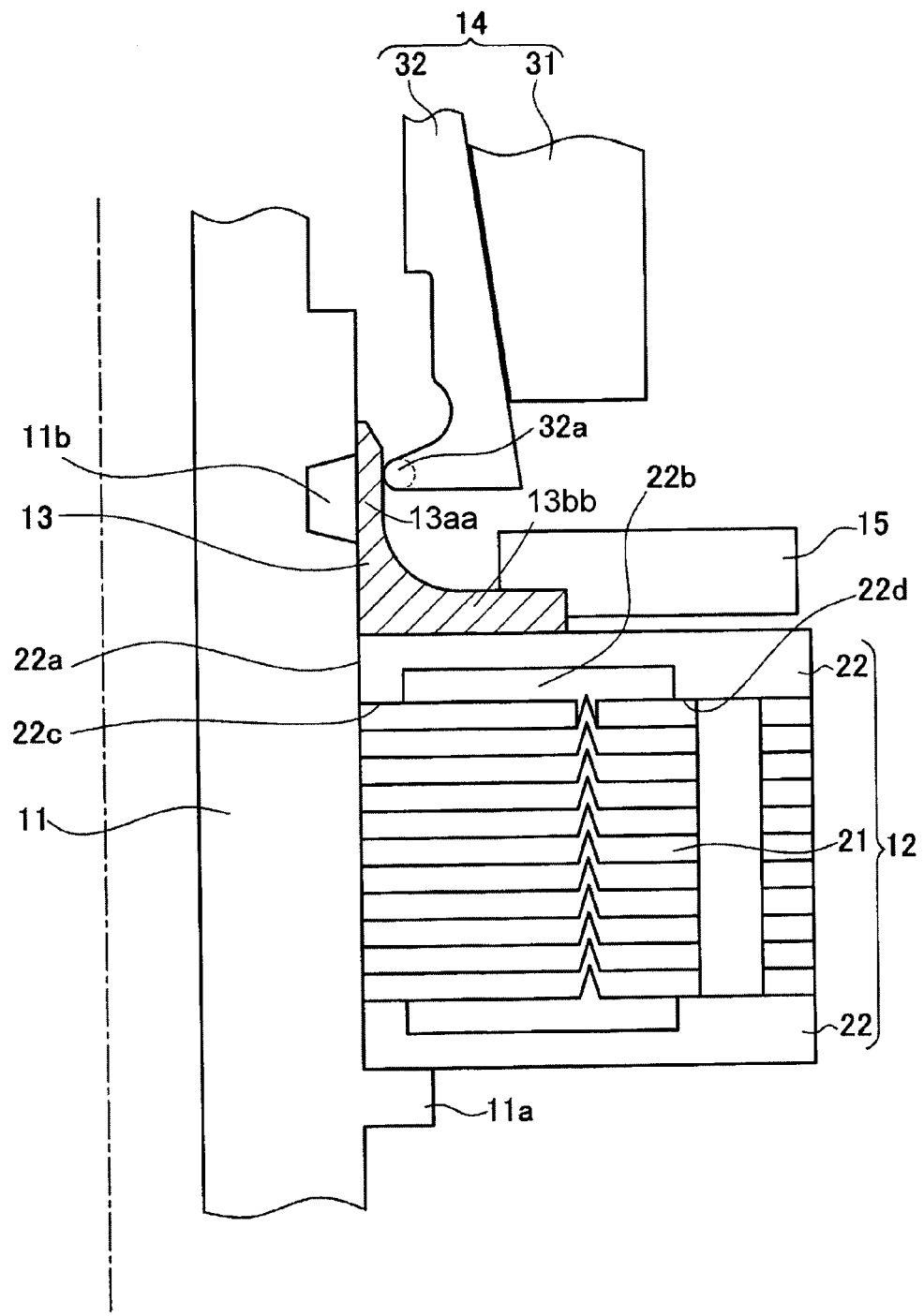
FIG. 1 is a schematic view of a first embodiment (before caulking)
Figure 2:
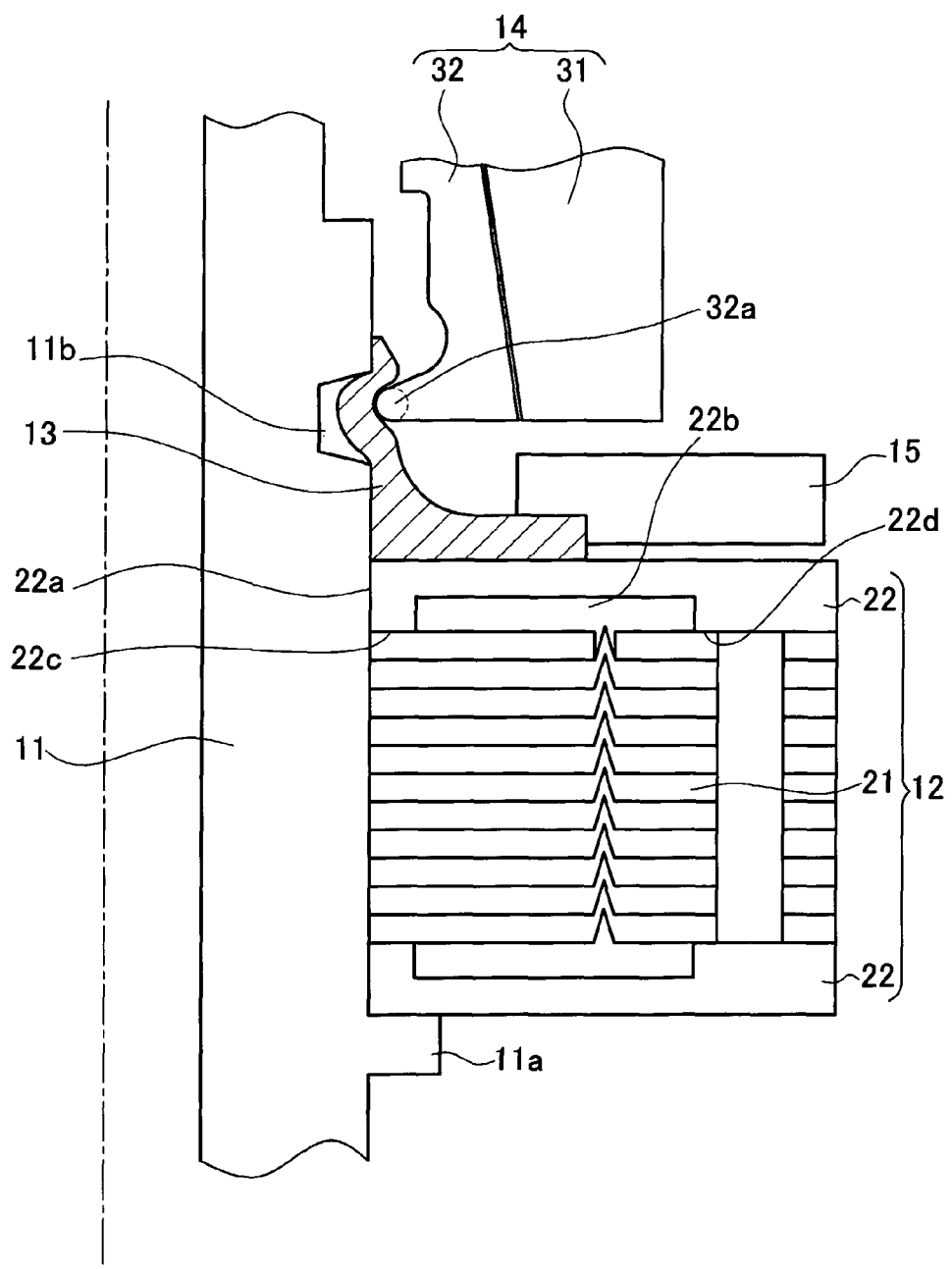
FIG. 2 is a schematic view of the first embodiment (after caulking)

FIGS. 1 and 2 illustrate an outline of a method for manufacturing a rotor shaft 1 according to a first embodiment of the present invention; FIG. 1 shows a state before fixing a rotor 12 to a shaft 11, aid FIG. 2 shows a state after fixing the rotor 12 to the shaft 11. As shown in FIGS. 1 and 2, the construction for implementing the method of manufacturing the rotor shaft 1 according to the present invention uses the shaft 11, rotor 12, caulking plate 13, punch 14, and pressing jig 15. The rotor 12 includes a rotor core 21 and end plates 22.

The shaft 11 is of a cylindrical shape having an outside diameter nearly coincident with the inside diameter of the rotor core 21. A flange portion 11a and a caulking groove 11b are circumferentially formed opening radially outwardly in the outer periphery of the shaft 11. One end face of an end plate 22 in the axial direction is supported by the flange portion 11a of the shaft 11. The end plates 22 are of a disc shape and centrally formed with an insertion hole 22a for insertion therein of the shaft 11. Further, each end plate 22 is formed with a cutout portion 22b as a wall cutout portion in an end face on the rotor core 21 side so that the cutout portion 22b extends circumferentially with a predetermined radial area (or width) in FIGS. 1 and 2. The end plates 22 are each centrally formed with the insertion hole 22a for insertion therein of the shaft 11 and the rotor core 21, which is constituted by disc-shaped laminated steel sheets, is put on one end plate 22. The other end plate 22 is placed on the rotor core 21 and the caulking plate 13 is disposed thereon. The caulking plate 13 may comprise a disc part 13bb and an insertion part 13aa. The disc part 13bb and the insertion part 13aa may be joined together in an L-shape. The caulking plate 13 is centrally formed with an insertion hole for insertion therein of the shaft 11. The pressing jig 15 is put on the caulking plate 13. The pressing jig 15 is of a hollow disc shape, of which an inner-periphery lower portion is fitted with the caulking plate 13.

Figure 3:
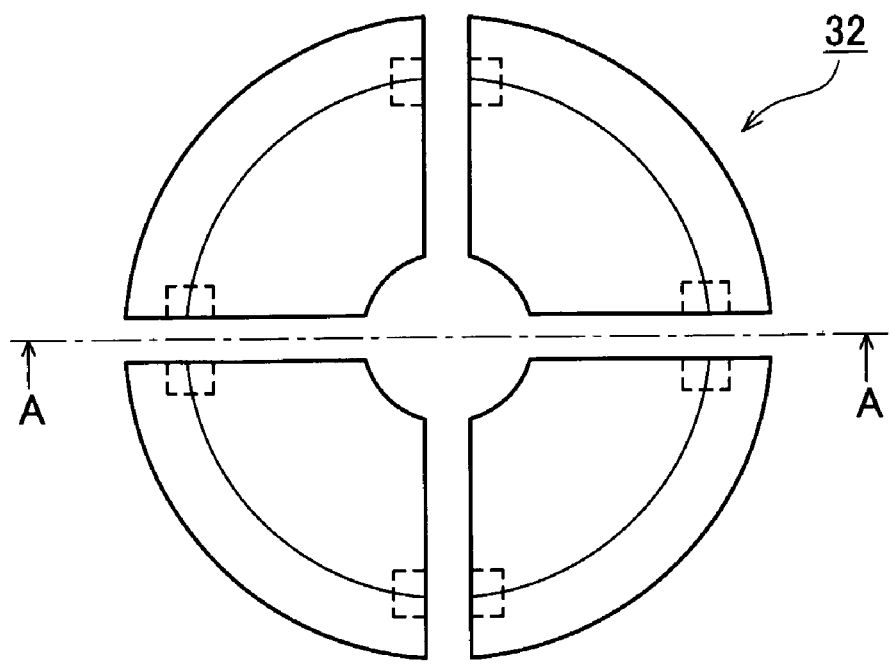
FIG. 3 is a top view of a pressing part of a punch.
Figure 4:
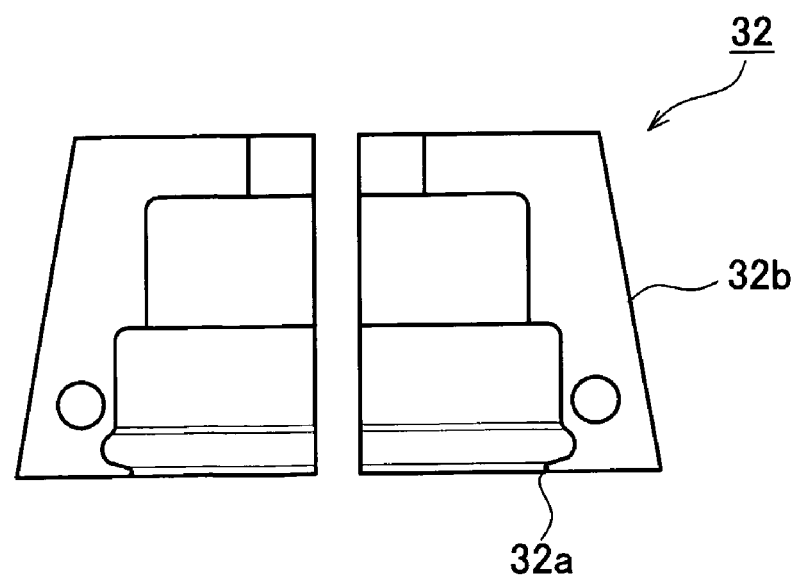
FIG. 4 is a view as seen in a direction of arrows A-A in FIG. 3.

As shown in FIG. 1, the punch 14 is disposed at a position in the axial direction of the rotor 12 with respect to the caulking plate 13 and the pressing jig 15. The punch 14 comprises a stroke part 31 adapted to move up and down in the axial direction of the rotor 12 and a pressing part 32 which upon contact therewith of the stroke part 31 presses the caulking plate 13 against the shaft 11 in a radially-inward direction. FIG. 3 is a top view of the pressing part 32 and FIG. 4 is a view as seen from a direction indicated by arrows A-A in FIG. 3. As shown in FIG. 3, the pressing part 32 of the punch 14 is of a quartered shape of a hollow truncated cone with a tapered outer surface 32 as shown in FIG. 4.

On the other hand, the stroke part 31 is of a hollow cylindrical shape having a tapered inner surface so as to move up and down while contacting the tapered outer surface 32b of the pressing part 32. The stroke part 31 and the pressing part 32 having such shapes constitute a cam mechanism such that the stroke part 31 is moved up and down in the axial direction of the rotor 12, thereby causing the pressing part 32 to move in the radial direction of the shaft 11.

Under such a construction, the following process is implemented in this embodiment.

First, as shown in FIG. 1, a punch tip 32a of the pressing part 32 of the punch 14 is put in abutment against an outer periphery of the caulking plate 13. At this time, the stroke part 31 of the punch 14 is located on the pressing part 32 but away from the caulking plate 13 in the axial direction of the rotor 12.

Then, the stroke part 31 of the punch 14 is moved toward the rotor 12. As a result, since the stroke part 31 and the pressing part 32 constitute the foregoing cam mechanism, the pressing part 32 moves inwardly in the radial direction of the shaft 11 and the punch tip 32a presses the caulking plate 13. The thus-pressed caulking plate 13 is deformed in the pressed portion and the vicinity thereof and is press-fitted into the groove 11b of the shaft 11.

Thereafter, when the stroke part 31 moves to its lowest position, the pressing part 32 moves to the innermost position in the radial direction of the shaft 11, inwardly pressing the caulking plate 13. As a result, the caulking plate 13 is press-fitted and fixed to the shaft 11 while it is adjacent to the upper end plate 22 in the axial direction of the rotor 12. Consequently, the end plates 22 and the rotor core 21 can no longer move in the axial direction and are fixed to the shaft 11. Thus, by press-fitting and fixing the caulking plate 13 to the shaft 11, the rotor 12 including the end plates 22 and the rotor core 21 can be caulked and fixed to the shaft through the caulking plate 13 adjacently contacting with the rotor 12 in the axial direction thereof the rotor 12.

In this embodiment, as described above, the caulking is effected not by deforming the shaft 11 but by deforming the caulking plate 13. Therefore, even in the case where the outside diameter of the rotor core 21 is small, it is possible to fabricate a corresponding punch 14 to fix the rotor 12 to the shaft 11 by caulking.

Moreover, in this embodiment, as described above, the punch tip 32a presses the caulking plate 13 in the radial direction. Consequently, the pressing force (caulking load) of the punch tip 32a acts in the direction in which the caulking plate 13 is press-fitted into the groove 11b of the shaft 11. For this reason, the caulking load for press-fitting the caulking plate 13 into the shaft 11 may be small. Particularly, in this embodiment, the punch tip 32a has a circular section to allow the punch tip 32a to initially abut against the caulking plate 13 at a point so that the pressing force of the punch tip 32a becomes concentrated. Therefore, the caulking load may be small. For this reason, a required extraction load of the rotor 12 can be ensured even without using a large caulking load.

Figure 5:
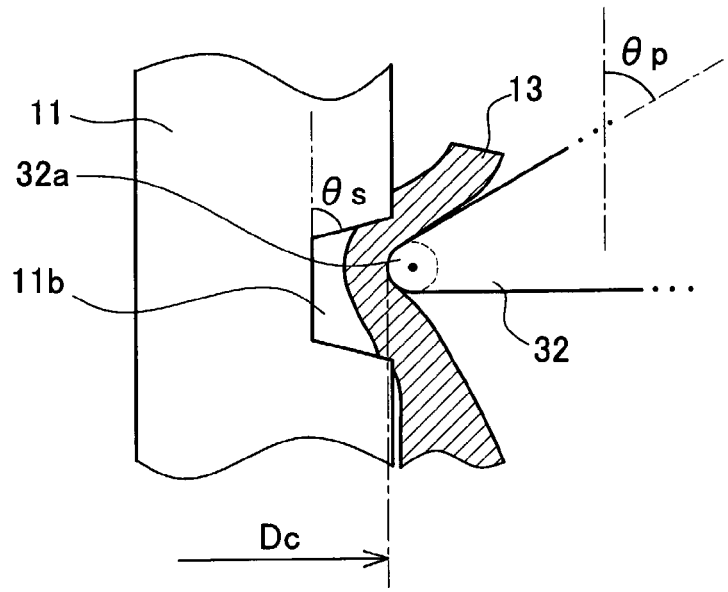
FIG. 5 is an enlarged view of a groove portion of a shaft.

FIG. 5 is an enlarged view of the groove 11b formed in the shaft 11. Assuming that upon crash G of a hybrid vehicle the caulking plate 13 becomes disengaged from the groove 11b of the shaft 11, thus causing disengagement of the rotor 12 from the shaft 11, a lower-limit value of the load imposed on the caulking plate 13 at this instant is designated an extraction load of the rotor 12. It can be said that the larger the extraction load of the rotor 12, the more difficult the disengagement of the rotor 12 from the shaft 11. This extraction load of the rotor 12 is correlated with the insertion quantity of the caulking plate 13 into the groove 11b of the shaft 11. In this embodiment, as noted earlier, the punch tip 32a presses the caulking plate 13 from outside in the radial direction. Consequently, the shape of the caulked portion of the caulking plate 13 appears conspicuously, thus making it easier to measure the outside diameter Dc of the caulked portion shown in FIG. 5. Therefore, by measuring the outside diameter Dc of the caulked portion after the fixation by caulking, it is possible to check the extraction load of the rotor 12 and hence possible to guarantee the quality of the rotor shaft 1 after the fixation by caulking.

The insertion quantity of the shaft 11 into the groove 11b is correlated with the stroke quantity in the radial direction of the punch 14. Moreover, the stroke part 31 and the pressing part 32 of the punch 14 constitute the foregoing cam mechanism, and by moving the stroke part 31 toward the rotor 12, the pressing part 32 moves inwardly in the radial direction of the shaft 11 and presses the caulking plate 13. Accordingly, there is a correlation also between the stroke quantity in the radial direction of the pressing part 32 of the punch 14 and the stroke quantity of the stroke part 31 of the punch in the axial direction of the rotor 12. Thus, it can be said that the extraction load of the rotor 12 is correlated with the stroke quantity of the stroke part 31 of the punch 14 in the axial direction of the rotor 12. It follows that the extraction load of the rotor 12 can be controlled also by controlling the stroke quantity of the stroke part 31 of the punch 14 in the axial direction of the rotor 12.

When the stroke part 31 of the punch 14 is moved toward the rotor 12, causing the pressing part 32 to move inwardly in the radial direction of the shaft 11 to press the caulking plate 13, it is necessary to press the end plates 22 in the axial direction so as not to form a gap between the end plates 22 and the rotor core 21. To meet this requirement, an axial load is applied to the end plates 22 by the pressing jig 15. In this case, if the end plate 22 adjacent to the caulking plate 13 is pressed directly by the pressing jig 15, the caulking plates 13 is fixed by caulking to the shaft 11 with a consequent fear of a gap being formed between the caulking plate 13 and the end plate 22.

To avoid such a defect, the caulking plate 13 is pressed by the pressing jig 15 to indirectly apply an axial load on the end plate 22 adjacent to the caulking plate 13. More specifically, as shown in FIGS. 1 and 2, the inner-periphery lower portion of the pressing jig 15 is fitted with the caulking plate 13 to form a clearance between the pressing jig 15 and the end plate 22. As a result, after the fixation by caulking, no gap is formed between the caulking plate 13 and the end plate 22. Consequently, the rotor 12 can be fixed more reliably.

Next, a description will be given about a characteristic shape of the end plates 22. As a method of forming a projecting portion (dowel) on a sheet and press-fitting it into a recess to form a caulked portion, there is known a caulking method called dowel caulking. The rotor core 21 is constituted by dowel-caulking laminated steel sheets. Therefore, the end face of each end plate 21 on the rotor core 21 side is required to have a shape that a part of the portion corresponding to the dowel-caulked portion is cut out in order to provide a relief for the dowel-caulked portion. In this case, if the width of the cutout portion in the radial direction is small, it will be possible to provide a relief for the dowel-caulked portion, but when the end plate 22 is pressed down against the rotor core 21 at the time of caulking, the width of an inner-periphery contact surface 22c of contact surfaces (22c, 22d) of the end plate 22 relative to the rotor core 21 which end surfaces are located on both sides in the radial direction of the cutout portion becomes large. Consequently, when pressing down the end plate 22 through the caulking plate 13 by the pressing jig 15 and pressing down the rotor core 21 by the end plate 22, the rotor core 21 is pressed down wholly in the radial direction. Thus, there is a fear that a gap may be formed between the end plate 22 and the rotor core 21 in the outer periphery portion.

In this embodiment, therefore, the end face of each end plate 22 on the rotor core 21 side is cut out over a wide area from near the dowel-caulked portion of the rotor core 21 up to near the inner periphery portion. By thus cutting-out a part of the rotor core 21-side end face of each end plate 22 over such a wide area, the width in the radial direction of the contact surface 22c of the end plate 22 relative to the rotor core 21 becomes small. Consequently, there acts a load concentrated on the contact surface 22c to press down the rotor core 21 and thus there is no fear of a gap being formed between the end plate 22 and the rotor core 21 in the outer periphery portion.

Figure 6:
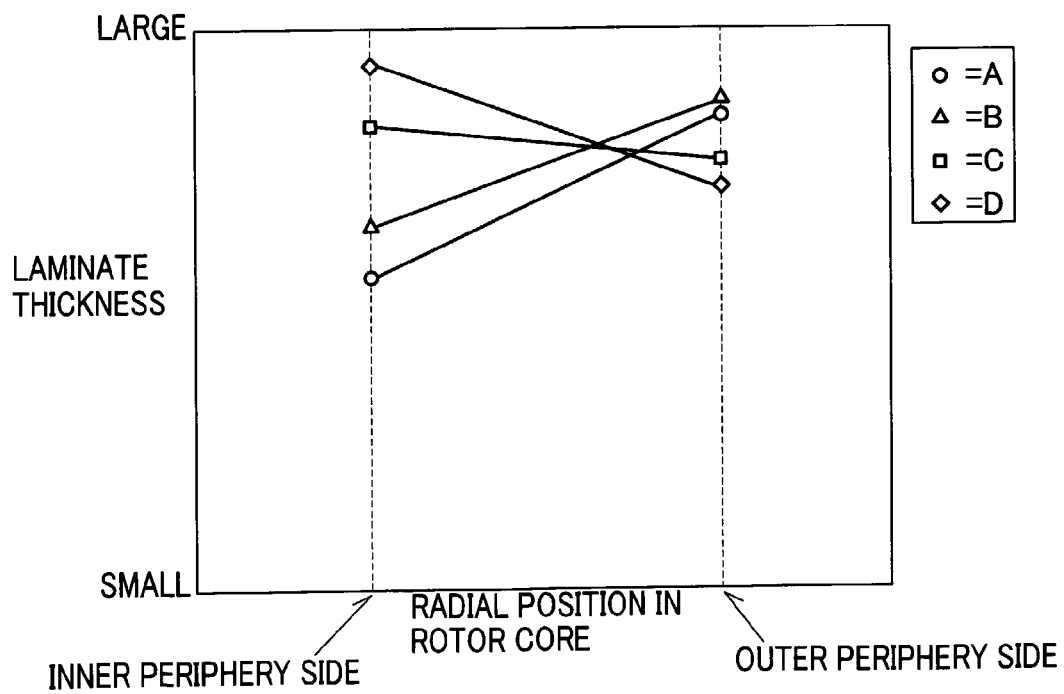
FIG. 6 is a graph showing results of evaluation of a relation between a radial position in a rotor core and a laminate thickness at that position.

For verification of the above effects, the applicant of the present application has checked in what state the laminate thickness of the rotor core 21 changes with changes in the radial width of the contact surface 22c. FIG. 6 is a graph showing a relation between a radial position in the rotor core 21 and the laminate thickness at that position. In the verification the width in the diametrical direction of the contact surface 22c was changed in four stages of A, B, C and D, which are in the relation of A<B<C<D. When the width in the radial direction of the contact surface 22c is small (A, B), the laminate thickness of the rotor core 21 is larger on the outer periphery side than on the inner periphery side or equal on both sides. However, when the radial width of the contact surface 22c is a predetermined value or larger (C, D), the laminate thickness is smaller on the outer periphery side than on the inner periphery side, with formation of a gap between the end plate 22 and the rotor core 21.

Figures 7, 8:
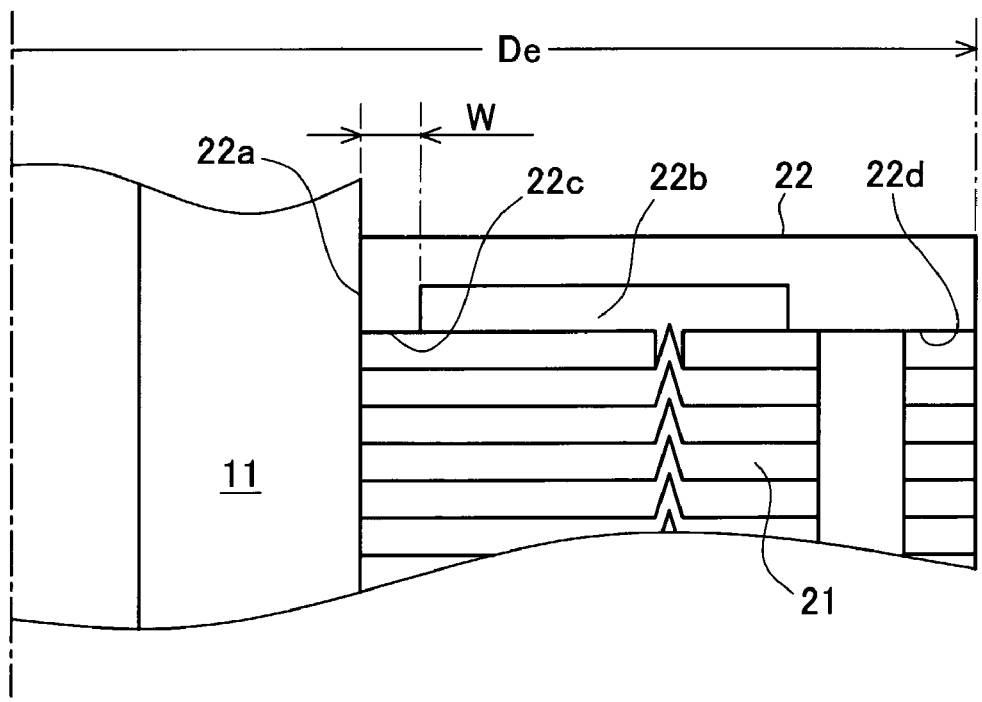
FIG. 7 is a table showing the results of evaluation shown in FIG. 6.
FIG. 8 is a view showing a positional relation between a diameter of an end plate and a radial width of a contact surface.

FIG. 7 is a table showing the results of evaluation shown in FIG. 6. In connection with the radial widths A, B, C and D of the contact surface 22c, FIG. 7 shows a relation between the ratio of the width in the diametrical direction of the contact surface 22c relative to the diameter of the end plate 22 and whether a gap is formed or not between the end plate 22 and the rotor core 21. From FIG. 7 it is seen that a gap is formed between the end plate 22 and the rotor core 21 when the ratio of the radial with of the contact surface 22c relative to the diameter of the end plate 22 is 26% or more. In view of the above results of verification it can be said that, as shown in FIG. 8, if the diameter of the end plate 22 is De and the width in the radial direction of the contact surface 22c is W and if the condition of (2×W/De)<0.26 is satisfied, there is no fear of a gap being formed between the end plate 22 and the rotor core 21 in the outer periphery portion. Thus, it is possible to ensure the required extraction load of the rotor 12.

Next, a description will be given about the relation between the angle of the groove 11b formed in the shaft 11 and the angle of the pressing part 32 of the punch 14. In this embodiment, as shown in FIG. 5, the following condition (I) is established on the assumption that a cut-in angle of the groove 11b of the shaft 11 is θs and the angle between the tapered shape of the pressing part 32 of the punch 14 and the axis of the rotor 12 is θp:

$$(θs-20°)<θp<(θs-10°) \quad (I)$$

The reason for establishing the condition (I) is as follows. Assuming that (θs−20°)>θp, the angle of the tip of the pressing part 32 of the punch 14 becomes large. Therefore, when the caulking plate 13 is pressed by the pressing part 32 of the punch 14, a reaction force from side faces of the groove 11b of the shaft 11 is large, resulting in the caulking load becoming large significantly. Consequently, with the standard caulking load, it is impossible to ensure a pressing quantity required of the pressing part 32 of the punch 14 and the caulking quantity of the caulking plate 13 becomes insufficient, thus making it impossible to ensure a satisfactory extraction load of the rotor 12. In view of this point, as a condition which permits ensuring a satisfactory extraction load of the rotor 12 even in the highest portion corresponding to the largest caulking load of the punch 14 within an allowable range in the axial direction of the rotor 12, the condition of (θs−20°)<θp is established.

Further, assuming that (θs−10°)<θp, the angle of the tip of the pressing part 32 of the punch 14 as a super-hard tool becomes very small and there is a fear that machining thereof may become impossible. Therefore, θp<(θs−10°) is established as a machinable range.

For the above reason, the relation between the angle of the groove 11b of the shaft 11 and the angle, of the pressing part 32 of the punch 14 is established like the foregoing condition (I). Thus, it is possible to ensure the required extraction load of the rotor 12.

Figure 9:
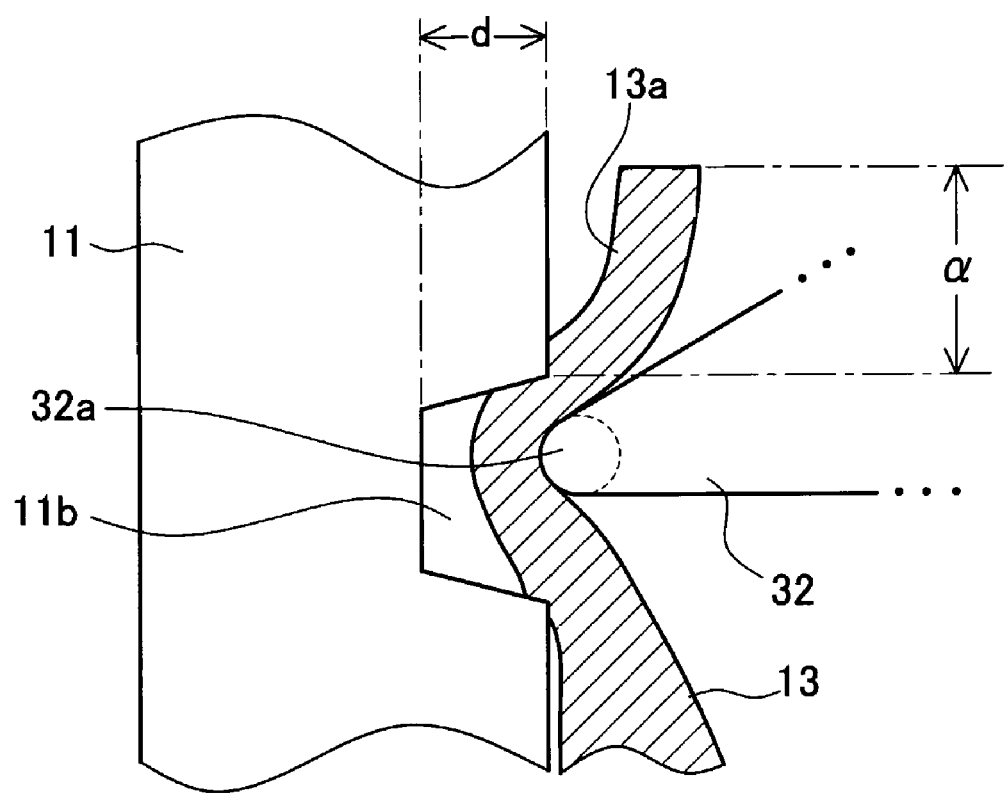
FIG. 9 is a view showing a relation between an allowance for projection of a caulking plate from the groove of the shaft and the depth of the shaft groove.

The following description is now provided about the relation between the allowance for projection (α) of the caulking plate 13 from the groove 11b of the shaft 11 and the depth (d) of the groove 11b of the shaft 11. FIG. 9 is a view showing the relation between the allowance for projection (α) and the depth (d). As shown in FIG. 9, the allowance for projection (α) indicates the width (length) of a part of the caulking plate 13 between the end face of an end portion 13a of the caulking plate 13 and a cut edge (an upper edge in FIG. 9) of the groove 11b of the shaft 11. As shown in the same figure, the value of the allowance for projection (α) of the caulking plate 13 from the groove 11b of the shaft 11 is set larger than the value of the depth of the groove 11b in the shaft 11. Therefore, the upper end portion 13a of the caulking plate 13 can be prevented from entirely getting into the groove 11b of the shaft 11 and it is possible to surely ensure the extraction load of the rotor 12.

It is also possible to prevent a part of the upper end portion 13a in the figure of the caulking plate 13 from getting into the groove 11b of the shaft 11 and another part thereof from projecting beyond the groove 11b to form a burr.

Next, a description will be given about the construction of the punch 14. In this embodiment, as shown in FIG. 3, the punch 14 is quartered in the circumferential direction to provide caulking and uncaulking portions. Therefore, after caulking, whether the caulking step is over or not can be checked by seeing the appearance of the rotor shaft 1. The number of divisions of the punch 14 is not limited to quartering, but may be, for example, division into two, three or five insofar as the punch 14 is divided into plural portions.

The following effects are obtained by the first embodiment described above.

(1) The present embodiment is described to exemplify the method of manufacturing the rotor shaft including the rotor 12 and the shaft 11 having the groove 11b formed in the periphery to open radially outwardly, the rotor 12 being fixed to the shaft 11 through the caulking plate 12 disposed in a predetermined place in contact with the periphery of the shaft 11 including the groove 11b and adjacent the rotor 12 in an axial direction thereof. The method includes the step of caulking the caulking plate 13 to fix the rotor 12 to the shaft 11 by applying a load to the end portion of the caulking plate 13 from outside in the radial direction, opposite the groove 11b, when the caulking plate 13 is disposed in the predetermined place, causing a part of the caulking plate 13 to be press-fitted into the groove 11b. The caulking and fixing step includes pressing the punch 14 against the caulking plate 13 from outside in a radial direction of the shaft 11, thereby fixing the rotor 12 to the shaft 11. Accordingly, it is not that the shaft 11 is deformed, but the caulking plate 13 is deformed. Therefore, even where the outside diameter of the rotor 12 is small, it is possible to fabricate a corresponding punch 14 and fix the rotor 12 to the shaft 11. Besides, the pressing force of the punch 14 acts in the direction that causes the caulking plate 13 to be press-fitted into the groove 11b of the shaft 11, and thus the caulking load can be made small. This makes it possible to ensure the required extraction load of the rotor 12. Further, after the fixation by caulking, the extraction load of the rotor 12 can be checked by measuring the outside diameter Dc of the caulked portion of the caulking plate 13. Thus, it is possible to ensure the quality of the rotor shaft after the fixation by caulking.

(2) According to this embodiment, in the rotor shaft manufacturing method described in the above (1), the caulking and fixing step includes fixing the rotor 12 to the shaft 11 with the pressing jig 15 which presses the caulking plate 13 against the rotor 12 in the axial direction thereof while ensuring a clearance between the pressing jig 15 and the rotor 12. Therefore, in addition to the effects referred to in the above (1) there also is attained an effect that the rotor 12 can be fixed more reliably because a gap is not formed between the caulking plate 13 and the rotor 12 after the fixation by caulking.

(3) According to this embodiment, in the rotor shaft manufacturing method described in the above (1) or (2), the caulking and fixing step includes fixing the rotor 12 to the shaft 11 under the condition of (θs−20)<θp<(θs−10), assuming that a cut-in angle of the groove 11b relative to the periphery of the shaft 11 is θs and the angle between the tapered shape of the tip of the punch 14 which presses the caulking plate 13 and the axis of the rotor 12 is θp. Therefore, in addition to the effects referred to in the above (1) or (2), there also is attained an effect that the punch 14 can be fabricated without any problem in point of machining strength and can ensure a required pressing quantity by applying a predetermined caulking load thereto. This makes it possible to surely ensure the extraction load required of the rotor 12.

(4) According to this embodiment, in the rotor shaft manufacturing method described in the above (1) to (3), the punch 14 is formed of a plurality of divided parts arranged in the circumferential direction. Accordingly, in addition to the effects described in the above (1) to (3) there also is obtained an effect that, after the fixation by caulking, it is possible to visually check whether the caulking and fixing step is over or not and that therefore it is possible to guarantee the quality of the rotor shaft after the fixation by caulking.

(5) In this embodiment, the rotor shaft comprises the rotor 12 including the rotor core 21 constituted by laminated steel sheets in a hollow cylindrical shape and the end plates 22 which are disposed adjacent the rotor core 21 in the axial direction thereof and whose end faces on the rotor core 21 side are each formed with the cutout portion 22b, whereby the end plates 22 are each in contact with the rotor core 21 through two contact surfaces (22c, 22d) located on the inner and outer periphery sides respectively, and the rotor shaft also comprises the shaft 11 on which the rotor 12 is fixed through the caulking plate 13. In such a rotor shaft, if the width in the radial direction of the inner-periphery contact surface 22c of each end plate 22 for contact with the rotor core 21 is assumed to be W and the diameter of the end plate 22 is assumed to be De, the condition of $(2 \times W/De)<0.26$ is satisfied, so that there is no fear of a gap being formed between the end plate 22 and the rotor core 21 in the outer periphery portion, thus making it possible to prevent the core from being broken by a centrifugal force during high-speed rotation.

(6) According to this embodiment, in the rotor shaft described in the above (5), the shaft 11 is formed with the groove 11b in the periphery, the rotor 12 is fixed by caulking to the shaft 11 though the caulking plate 13 disposed in the predetermined place of the shaft 11 including the groove 11b, and the allowance for projection (α) corresponding to the width of the caulking plate 13 between the end thereof in the axial direction of the rotor 12, the caulking plate 13 having been fixed to the shaft 11 by caulking, and the edge of the groove 11 is larger than the depth (d) of the groove 11b of the shaft 11 in the radial direction. Accordingly, in addition to the effect described in the above (5) there also is obtained an effect that it is possible to prevent a part of the upper end portion of the caulking plate 13 from projecting beyond the groove 11b of the shaft 11 and forming a burr.

Second Embodiment

Next, a second embodiment of the present invention will be described below.

Figure 10:
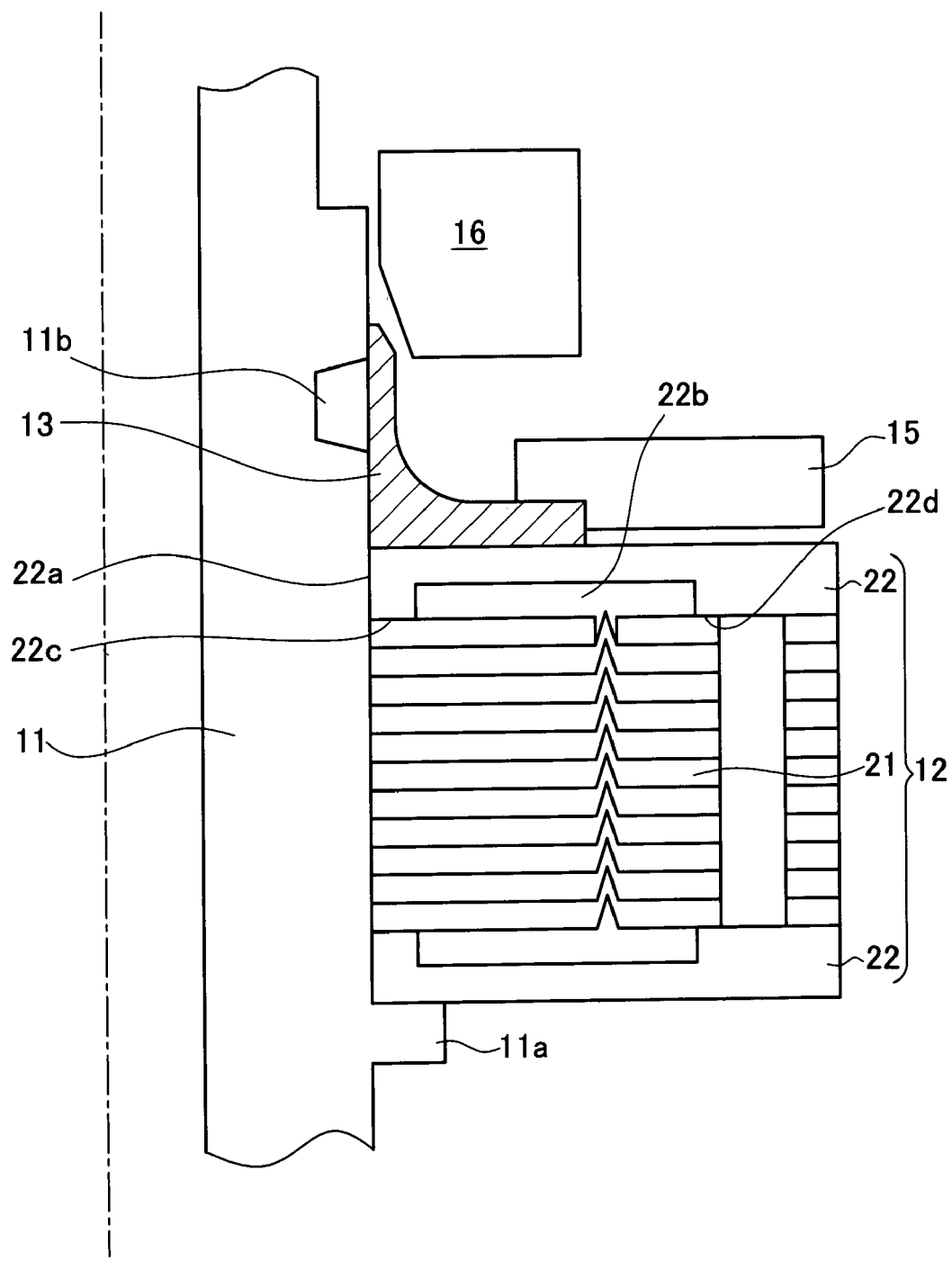
FIG. 10 is a schematic view of a second embodiment (before caulking)
Figure 11:
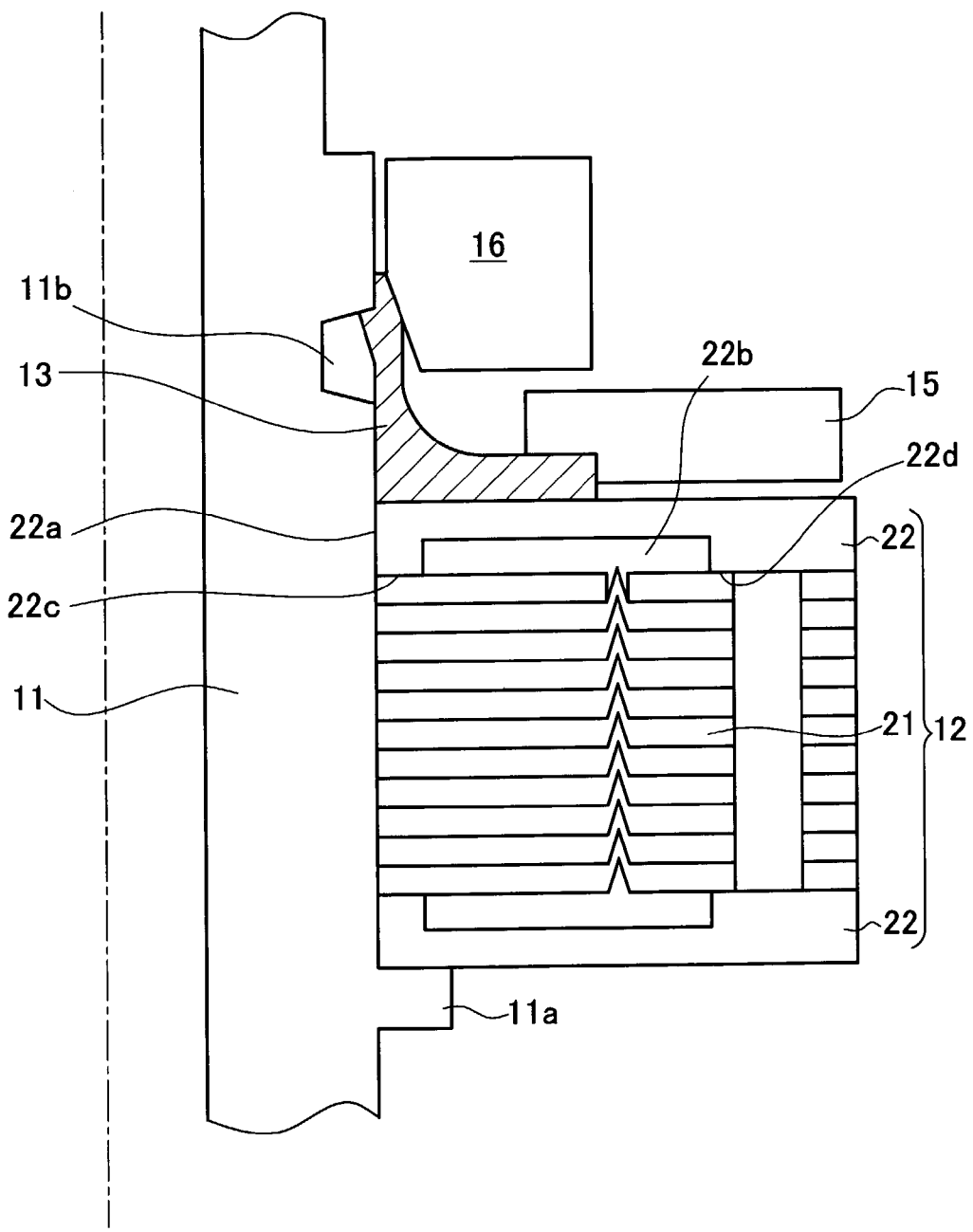
FIG. 11 is a schematic view of the second embodiment (after caulking)

FIGS. 10 and 11 show an outline of a rotor shaft manufacturing method according to the second embodiment; FIG. 10 shows a state before fixing a rotor 12 to a shaft 11 and FIG. 11 shows a state after fixing the rotor 12 to the shaft 11. In the construction for implementing the method of manufacturing the rotor shaft, indicated at 2, of this second embodiment, the point different from the first embodiment resides in a punch 16. The punch 16 is of a hollow cylindrical shape having a tapered inner surface forming the hollow portion. An end face-side diameter of the tapered portion of the punch 16 is set larger than the outside diameter of the vertical portion of a caulking plate 13, while an inner periphery-side diameter of the tapered portion of the punch 16 is set smaller than the outside diameter of the vertical portion of the caulking plate 13. The other constructional members than the punch 16 are common to the first embodiment and therefore explanations thereof will be omitted.

The following process is implemented under such a construction of the second embodiment.

The punch 16 is moved down in the axial direction of the rotor 12 from the state shown in FIG. 10. Then, as shown in FIG. 11, the tapered portion of the punch 16 comes into contact with the caulking plate 13, thereby pressing the caulking plate 13 against the groove 11b of the shaft 11. As a result, a part of the caulking plate 13 is press-fitted into the groove 11b of the shaft 11 to fix the rotor 12 to the shaft 11.

Figure 12:
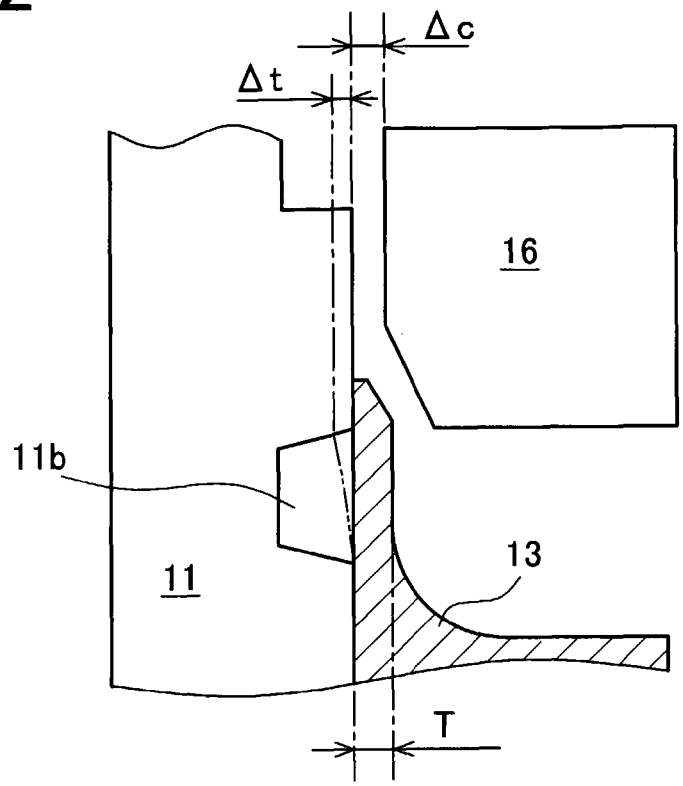
FIG. 12 is a schematic view of a punch, a rotor shaft and a caulking plate.

FIG. 12 is a schematic view of the punch 16, shaft 11 and caulking plate 13. In the present invention, as shown in FIG. 12, it is assumed that a clearance quantity between the outer periphery of the shaft 11 and the punch 16 is Δc, the thickness of the portion of the caulking plate 13 to which a radial load is applied by the punch 16 is a fixing member thickness T, and the depth of the groove 11b in which a part of the caulking plate 13 is received is a groove bite-in depth Δt.

In the present invention, the following conditional equation (II) is established:

$$\Delta c = T - \Delta t \quad \text{(II)}$$

By thus providing the clearance quantity Δc between the outer periphery of the shaft 11 and the punch 16, the amount of the caulking plate 13 inserted into the clearance between the shaft 11 and the punch 16 increases, resulting in an increase of the strength thereof. Therefore, the caulking plate 13 does not fall off during caulking and when pulling out the punch 16, thus making it possible to prevent the formation of a burr.

Figure 13:
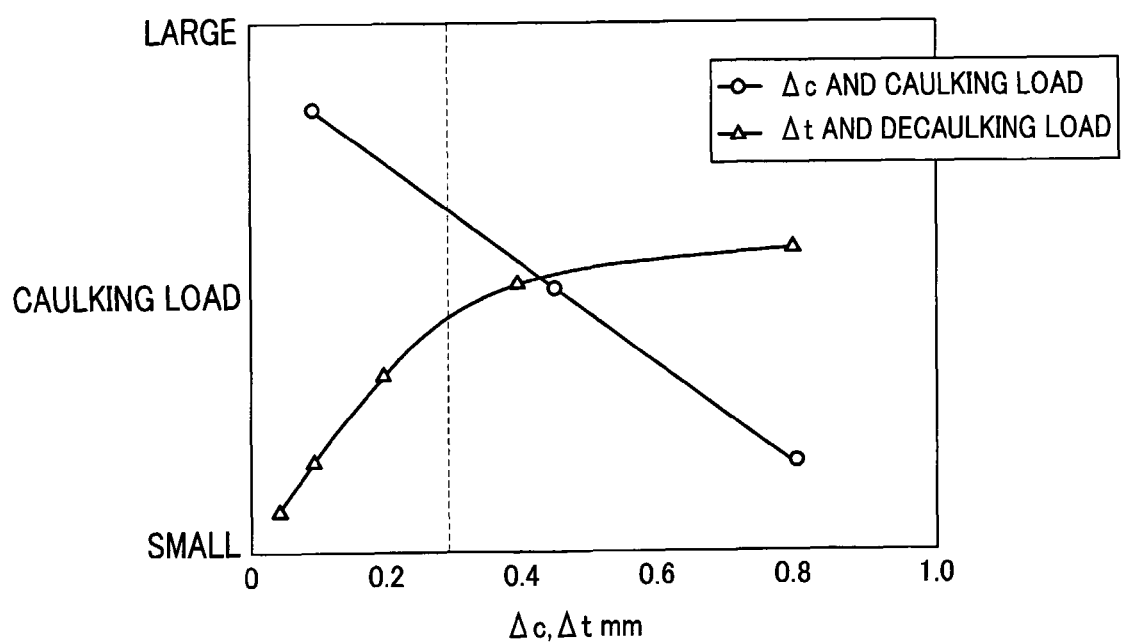
FIG. 13 is a view showing results of inspection of a relation between Δc and a caulking load and a relation between Δt and a decaulking load.

The applicant of the present application has checked by experiment the relation between Δc and the caulking load and the relation between Δt and the decaulking load. FIG. 13 shows the results of having checked such relations. As shown in FIG. 13, the value of Δc and the caulking load are in a proportional relation. It is seen that the smaller the value of Δc, the larger the caulking load, and the larger the value of Δc, the smaller the caulking load. The relation between Δt and the decaulking load is represented by a curved line. It is seen that the smaller the value of Δt, the smaller the decaulking load, and the larger the value of Δt, the larger the decaulking load. There also is shown a region in which the caulking plate 13 getting into the clearance between the shaft 11 and the punch 16 does not fall off when pulling out the punch 16 and hence a burr is not formed. From FIG. 13 it is seen that a burr is not formed when the value of Δc is 0.3 mm or more. Therefore, it is preferable that the value of Δc be 0.3 mm or more.

As shown in FIGS. 10 and 11, the punch 16 is formed with a tapered tip. With such a tapered portion, when the caulking plate 13 is compressed axially of the rotor 12 by the punch 16, a load is imposed on the caulking plate 13 in the radial direction. With this load applied from outside in the radial direction, the caulking plate 13 is press-fitted into the groove 11b of the shaft 11. Therefore, with a small caulking load, it is possible to push the caulking plate 13 into the groove 11b of the shaft 11 and fix the rotor 12 to the shaft 11.

Thus, the required extraction load of the rotor 12 can be ensured more reliably.

Figure 14:
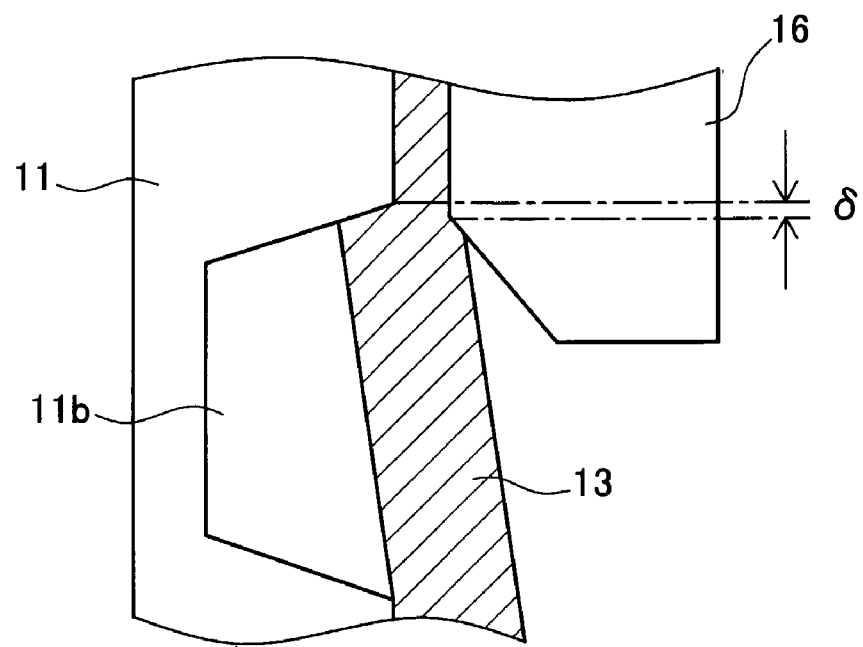
FIG. 14 is an enlarged view of a shaft groove portion in maximum stroke of the punch.

FIG. 14 is an enlarged view of the groove 11b of the shaft 11 in the maximum stroke of the punch 16. As shown in FIG. 14, an end of the tapered portion of the punch 16 is set to assume a lower position in the axial direction of the rotor 12 than an cut edge (an upper edge in the figure) of the shaft groove 11b. Accordingly, a load is imposed on the caulking plate 13 in the radial direction of the shaft 11 by the entire tapered portion of the punch 16. Consequently, the caulking plate 13 is reliably pushed into the groove 11b of the shaft 11 and thus the extraction load of the end plates 22 can be made large.

Figure 15:
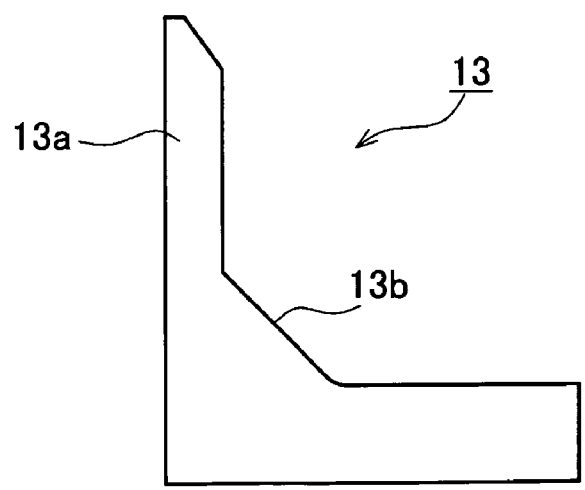
FIG. 15 is a view showing a state of the caulking plate before exertion of a compressive load thereon.
Figure 16:
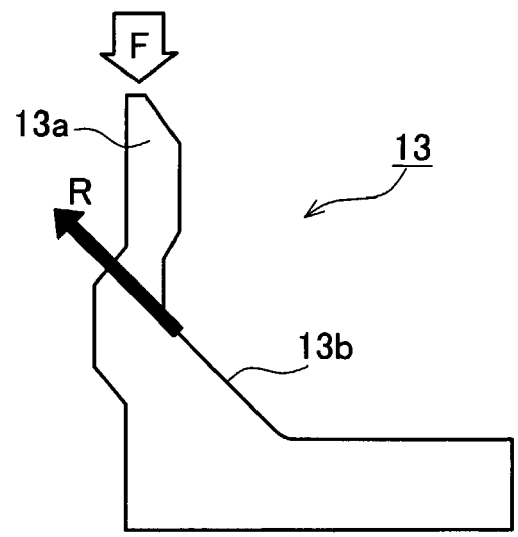
FIG. 16 is a view showing a state of the caulking load upon exertion of a compressive load thereon.
Figure 17:
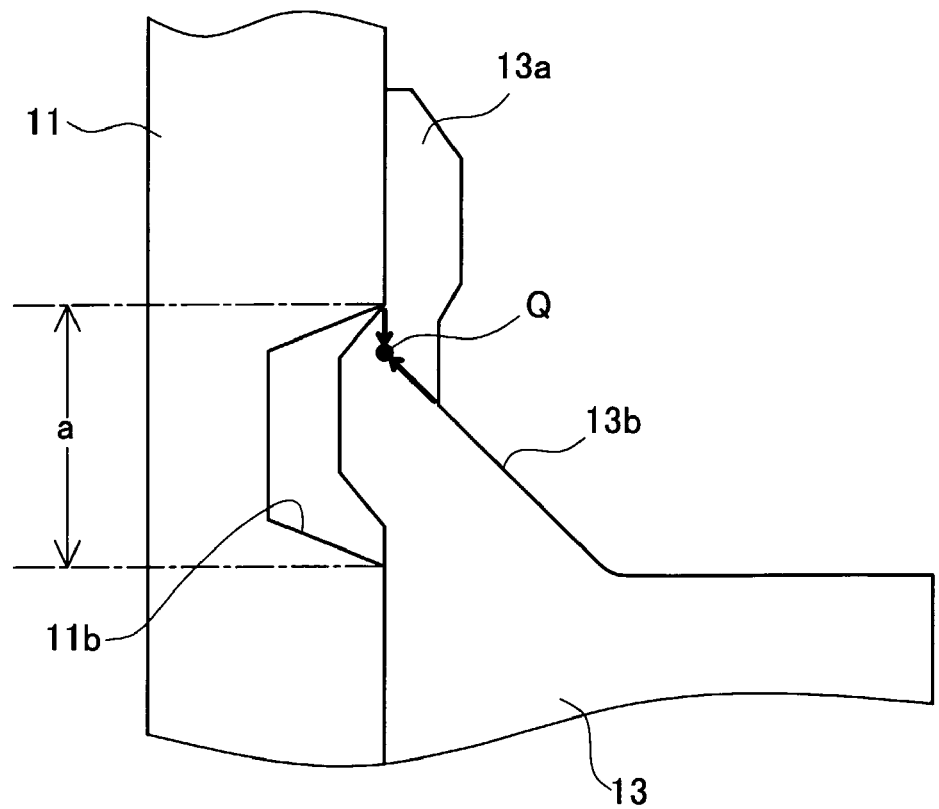
FIG. 17 is a view showing how to set a tapered portion of the caulking plate.

FIG. 15 shows the state of the caulking plate 13 just before imposition of a compressive load thereon. As shown in FIG. 15, the caulking plate 13 is formed with a tapered portion 13b. In this state, if a compressive load is applied to an upper end portion 13a of the caulking plate 13 in the axial direction of the rotor 12, the tapered portion 13b stretches itself to hold back the compressed end portion 13a, so that the material of the caulking plate 13 on the inner periphery side flows and the vicinity of a terminal end of the tapered portion bulges, as shown in FIG. 16. By press-fitting this bulged portion into the groove 11b of the shaft 11, it is possible to fix the rotor 12 to the shaft 11 even if the upper end portion 13a of the caulking plate 13 is distant from the groove 11b. As shown in FIG. 17, the shape of the tapered portion 13b is determined so that the position of an intersecting point Q between an extension line of the tapered portion 13b and that of the outer periphery of the shaft 11 lies within the area of the groove 11b. By so setting the shape of the tapered portion 13b, it is possible to surely fix the rotor 12 to the shaft 11 and the required extraction load of the rotor 12 can be ensured more reliably.

Figure 18:
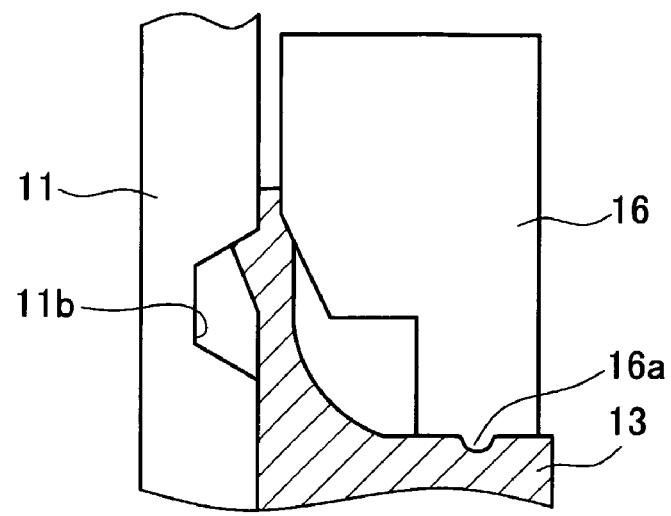
FIG. 18 is a view showing an example in which a projecting portion is formed at a tip of the punch to make an engraved mark an upper surface of the caulking plate.
Figure 19:
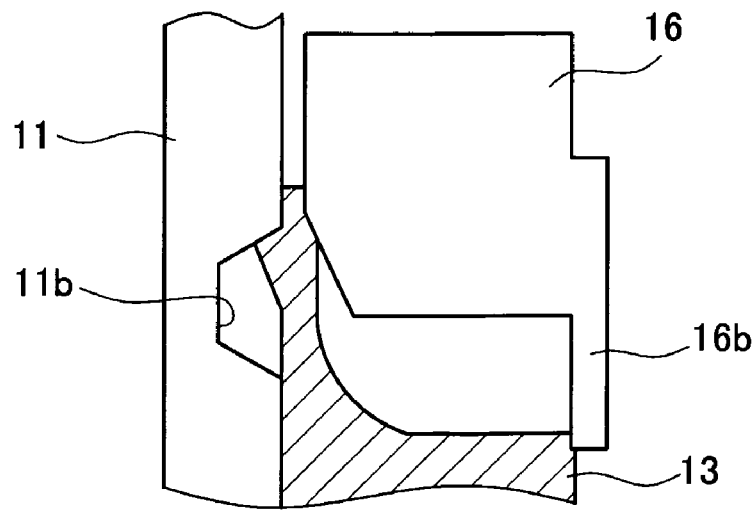
FIG. 19 is a view showing an example in which a projecting portion is formed at the tip of the punch to make an engraved mark on a side face of the caulking plate.
Figure 20:
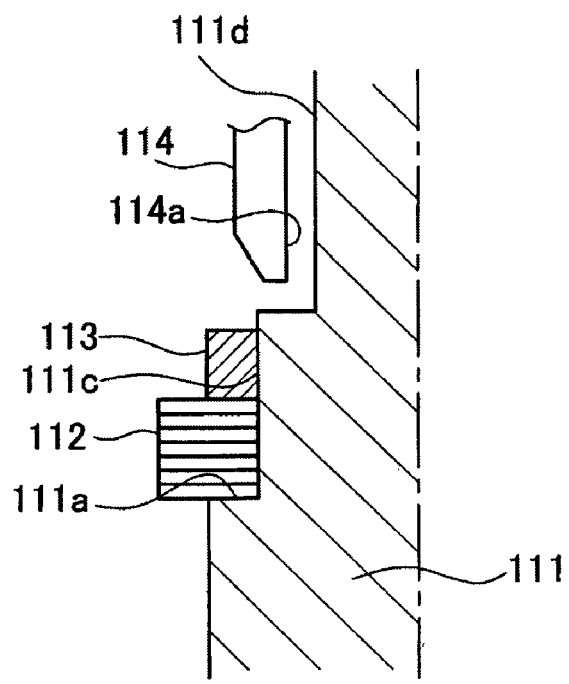
FIG. 20 is a view showing Example 1 of a method for fixing a rotor to a shaft which method is disclosed in Japanese unexamined patent publication No. 2004-48925.
Figure 21:
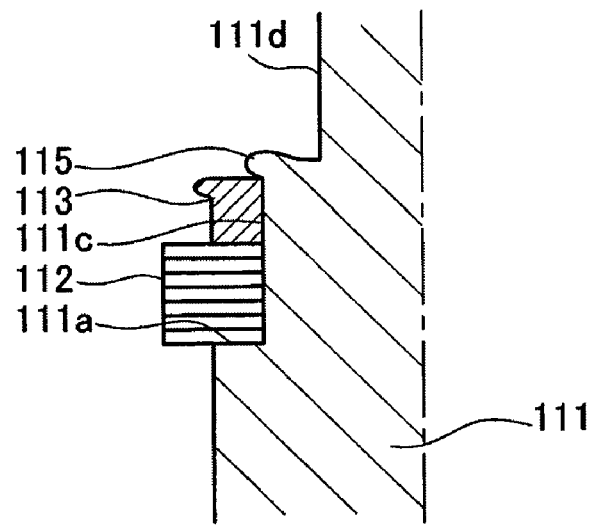
FIG. 21 is a view showing the Example 1 disclosed in the publication '925.
Figure 22:
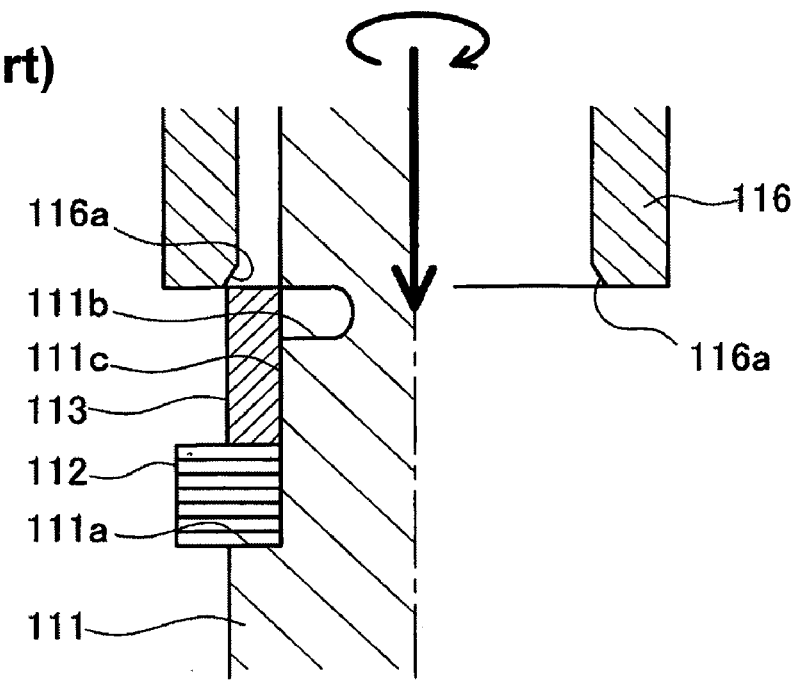
FIG. 22 is a view showing Example 2 of a method for fixing a rotor to a shaft which method is disclosed in the publication '925.
Figure 23:
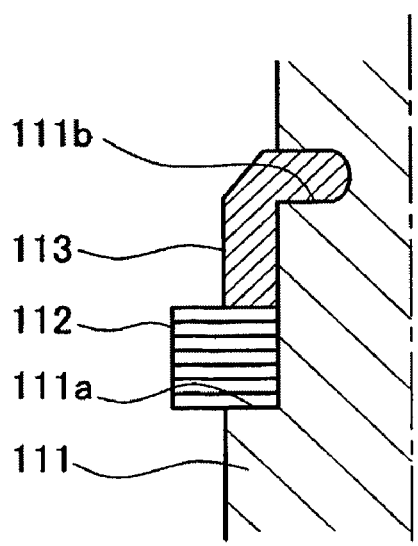
FIG. 23 is a view showing the Example 2 disclosed in the publication '925.

As shown in FIG. 18, a protuberance 16a may be provided on the tip of the punch 16 to form an engraved mark on the upper surface of the caulking plate 13 when the punch 16 is brought into contact with the caulking plate 13. Alternatively, as shown in FIG. 19, a projecting portion 16b may be provided on a side face of the tip of the punch 16 to form an engraved mark on a side face of the caulking plate 13 when the punch 16 is brought into contact with the caulking plate. By thus making the engraved mark on the caulking plate 13, the end of the caulking and fixing step can be confirmed by seeing the appearance of the rotor shaft and hence it is possible to guarantee the quality of the rotor shaft after the fixation by caulking.

As to the following points, explanations thereof will be omitted because they are common to the first embodiment; (1) A clearance is formed between the pressing jig 15 and the end plate 22 during fixation by caulking, (2) the end plate 22 has a characteristic shape, (3) a relation is established between the allowance for projection (α) of the caulking plate 13 from the groove 11b of the shaft 11, and (4) the punch 16 is quartered in the circumferential direction.

The following effects are obtained by the second embodiment described above.

(1) The second embodiment exemplifies the method of manufacturing the rotor shaft including the rotor 12 and the shaft 11 having the groove 11b formed in the periphery to open radially outwardly, the rotor 12 being fixed to the shaft 11 through the caulking plate 13 disposed in a predetermined place in contact with the periphery of the shaft 11 including the groove 11b and adjacent the rotor 12 in an axial direction thereof. This method comprises the step of: caulking the caulking plate 13 to fix the rotor 12 to the shaft 11 by applying a load to the end portion of the caulking plate 13 from outside in the radial direction, opposite the groove 11, when the caulking plate 13 is disposed in the predetermined place, causing a part of the caulking plate 13 to be press-fitted into the groove 11. The caulking and fixing step includes fixing the rotor 12 to the shaft 11 by caulking under the condition of $\Delta c = T - \Delta t$, assuming that the clearance quantity between the punch 16 and the shaft 11 is a punch-shaft clearance quantity $\Delta c$, the punch 16 being adapted to move up and down in the axial direction of the rotor 12 to apply a load to the end portion of the caulking plate 13 from outside in the radial direction, opposite the groove 11, the thickness of the portion of the caulking plate 13 to which portion the radial load is applied by the punch 16 is the fixing member thickness T, and the depth in the groove 11 in which depth a part of the caulking plate 13 is received is a groove bite-in depth $\Delta t$.

Accordingly, it is not that the shaft 11 is deformed, but the caulking plate 13 is deformed. Therefore, even where the outside diameter of the rotor 12 is small, it is possible to fabricate the corresponding punch 16 and fix the rotor 12 to the shaft 11 by caulking. Besides, since the amount of the caulking plate 13 getting into the clearance between the shaft 11 and the punch 16 is increased to enhance the strength thereof, there is no fear of a part of the caulking plate 13 falling off during caulking and when pulling out the punch 16 from the shaft 11, thus making it possible to prevent the formation of a burr.

(2) According to the second embodiment, in the rotor shaft manufacturing method described in the above (1), the punch 16 is formed with the tapered surface on the inner periphery thereof through which the radial load is applied to the caulking plate 13. Accordingly, in addition to the effects referred to in the above (1) there also is obtained an effect that, with a small caulking load, the caulking plate 13 can be press-fitted into the groove 11b of the shaft 11 to fix the rotor 12 to the shaft 11 and hence a required extraction load of the rotor 12 can be ensured more reliably.

(3) According to the second embodiment, in the rotor shaft manufacturing method described in the above (1) or (2), the caulking plate 13 has the tapered portion 13b on the outer periphery thereof opposite to the groove 11b, the tapered portion being formed so that the intersecting point Q between an extension line of the tapered portion 13b and the outer periphery of the shaft 11 lies on the outside diameter of the shaft 11 and within the area of the groove 11b in the axial direction of the rotor 12. Therefore, in addition to the effects described in the above (1) or (2) there also is obtained an effect that the caulking plate 13 can be press-fitted positively into the groove 11b of the shaft 11 to fix the rotor 12 to the shaft 11, whereby the required extraction load of the rotor 12 can be ensured more reliably.

(4) According to the second embodiment, in the rotor shaft manufacturing method described in any of the above (1) to (3), the protuberance or projecting portion (16a, 16b) for making an engraved mark on the caulking plate 13 when fixing the rotor 12 to the shaft 11 is formed on the rotor 12-side end surface of the punch 16. Therefore, in addition to the effects described in the above (1) to (3) there also is obtained an effect that, after the fixation by caulking, the caulked state can be checked by seeing the appearance of the rotor shaft and that therefore it is possible to guarantee the quality of the rotor shaft after the fixation of the caulking.

(5) In the second embodiment, the rotor shaft comprises the rotor 12 including the rotor core 21 constituted by laminated steel sheets of a hollow cylindrical shape and the end plates 22 disposed adjacent the rotor core 21 in the axial direction of the rotor core 21, with the cutout portion 22b being formed in an end face of each end plate 21, so that the end plates 22 are each in contact with the rotor core 21 through two contact surfaces (22c, 22d) located on the inner and outer periphery sides respectively. In such rotor shaft, if the width in the radial direction of the inner periphery contact surface 22c of each end plate 22 is assumed to be W and the diameter of the end plate 22 is assumed to be De, the condition of (2×W/De)<0.26 is satisfied. Consequently, there is no fear of a gap being formed between the end plate 22 and the rotor core 21 in the outer periphery portion, thus making it possible to prevent the core from being broken by a centrifugal force during high-speed rotation.

(6) According to the second embodiment, in the rotor shaft described in the above (5), the shaft 11 is formed with the groove 11b on, the periphery, the rotor 12 is fixed by caulking to the shaft 11 though the caulking plate 13 disposed in the predetermined place of the shaft 11 including the groove 11b, and the allowance for projection (α) corresponding to the width of the caulking plate 13 between the end of the caulking plate 13 in the axial direction of the rotor 12, the caulking plate 13 being fixed to the shaft 11 by caulking, and the edge of the groove 11 is larger than the depth (d) of the groove 11b of the shaft 11 in the radial direction. Therefore, in addition to the effect described in the above (5) there also is obtained an effect that it is possible to prevent a part of the front end portion of the caulking plate 13 from projecting beyond the groove 11b of the shaft 11 to form a burr.

The present invention is not limited to the above embodiments, but various changes may be made within the scope not departing from the gist of the invention.

The invention claimed is:

1. A method of manufacturing a rotor shaft including a rotor that includes a rotor core constituted by laminated steel sheets in a hollow cylindrical shape and an end plate disposed on an end face of the rotor core, and a shaft having a groove formed on a periphery to open radially outwardly, the rotor being fixed to the shaft through a fixing member disposed in a predetermined place in contact with the periphery of the shaft including the groove and adjacent the rotor in an axial direction thereof, wherein the fixing member includes an insertion part formed with an insertion hole in which the shaft is to be inserted and a disc part which will contact with the end plate, and the method comprising the step of:

caulking the fixing member to fix the rotor to the shaft by applying a load to an end of the fixing member from outside in a radial direction, opposite the groove, when the fixing member is disposed in the predetermined place, causing a part of the insertion part of the fixing member to be press-fitted into the groove, the caulking and fixing step including pressing a caulking jig against the fixing member from outside in a radial direction of the shaft, thereby fixing the rotor to the shaft.

2. The method according to claim 1, wherein the caulking and fixing step includes fixing the rotor to the shaft with a pressing jig which presses the fixing member against the rotor in the axial direction thereof while ensuring a clearance between the pressing jig and the rotor.

3. The method according to claim 1, wherein the caulking and fixing step includes fixing the rotor to the shaft by caulking under a condition of (θs−20)<θp<(θs−10), assuming that a cut-in angle of the groove relative to the periphery of the shaft is θs and an angle between a tapered shape of a tip of the caulking jig for pressing the fixing member and the axis of the rotor is θp.

4. The method according to claim 1, wherein the caulking jig is formed of a plurality of divided parts arranged in a circumferential direction to bend the fixing member at positions divided in the circumferential direction.

5. A method of manufacturing a rotor shaft including a rotor that includes a rotor core constituted by laminated steel sheets in a hollow cylindrical shape and an end plate disposed on an end face of the rotor core, and a shaft having a groove formed on a periphery to open radially outwardly, the rotor being fixed to the shaft through a fixing member disposed in a predetermined place in contact with the periphery of the shaft including the groove and adjacent the rotor in an axial direction thereof, wherein the method comprises the step of:

caulking the fixing member to fix the rotor to the shaft by applying a load to an end portion of the fixing member from outside in a radial direction, opposite the groove, when the fixing member is disposed in the predetermined place, causing a part of the fixing member to be press-fitted into the groove, the caulking and fixing step including fixing the rotor to the shaft by caulking under a condition of $\Delta c = T - \Delta t$, assuming that a clearance quantity between a caulking jig and the shaft is a punch-shaft clearance quantity $\Delta c$, the caulking jig being adapted to move up and down in the axial direction of the rotor to apply a load to the end portion of the fixing member from outside in the radial direction, opposite the groove, the thickness of the portion of the fixing member to which portion the radial load is applied by the caulking jig is a fixing member thickness T, and the depth in the groove in which depth a part of the fixing member is received is a groove bite-in depth $\Delta t$, wherein the fixing member has a tapered portion on an outer periphery thereof opposite the groove before applying the load, the tapered portion being formed so that an intersecting point between an extension line of the tapered portion and the outer periphery of the shaft lies on an outside diameter of the shaft and within the area of the groove.

6. The method according to claim 5, wherein the caulking member is formed with a tapered surface on an inner periphery thereof through which the radial load is applied to the fixing member.

7. The method according to claim 5, wherein the caulking jig is formed, on a rotor-side end surface, with a projection for making an engraved mark on the fixing member when fixing the rotor to the shaft by caulking.

8. A rotor shaft comprising a rotor including a rotor core constituted by laminated steel sheets in a hollow cylindrical shape and an end plate disposed adjacent the rotor core in an axial direction of the rotor core, with a cutout portion being formed in an end face of the end plate on the rotor core side, so that the end plate is in contact with the rotor core through two inner-periphery and outer-periphery contact surfaces, and a shaft on which the rotor is fixed through a fixing member, wherein the rotor core and the end plate are designed so that a condition of (2×W/De)<0.26 is satisfied, assuming that a radial width of the inner periphery-side contact surface of the end plate for contact with the rotor core is W and the diameter of the end plate is De.

9. The rotor shaft according to claim 8, wherein the shaft is formed with a groove on a periphery, the rotor is fixed by caulking to the shaft through the fixing member disposed in a predetermined place of the shaft including the groove and an allowance for projection corresponding to a width of the fixing member between an end of the fixing member in the axial direction of the rotor, the fixing member being fixed to the shaft by caulking, and an edge of the groove is larger than a depth of the groove of the shaft in the radial direction.

* * * * *